Feb. 1, 1966

H. M. HAWKINS 3,232,069

COOLING CONTROL IN FRACTIONAL CRYSTALLIZATION
RESPONSIVE TO SOLIDS MEASUREMENT

Filed Feb. 1, 1962

INVENTOR.
H. M. HAWKINS
BY Young & Quigg
ATTORNEYS

United States Patent Office 3,232,069
Patented Feb. 1, 1966

3,232,069
COOLING CONTROL IN FRACTIONAL CRYSTALLIZATION RESPONSIVE TO SOLIDS MEASUREMENT
Harold M. Hawkins, Bartlesville, Okla., assignor to Phillips Petroleum Company, a corporation of Delaware
Filed Feb. 1, 1962, Ser. No. 170,610
1 Claim. (Cl. 62—58)

This invention relates to the separation and purification of components of multi-component mixtures. Broadly, it relates to a method for determining the fusible solids content of a solid-liquid slurry. In one aspect, it relates to the separation and purification of components of a multi-component mixture by fractional crystallization. In another aspect, it relates to means for controlling the solids content of a slurry supplied to the purification column of fractional crystallization apparatus. In still another aspect, it relates to a method for controlling the solids content of a slurry produced by a chiller used in fractional crystallization apparatus.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may be the only method which can be advantageously employed.

As well as offering in many cases perhaps the only practicable method of separation, the crystallization method offers the further advantage of being the only separation method which in the case of eutectic-forming systems theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurities since the concentration of impurity in the new liquid is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the process is carried.

More recently, a continuous method of separating and purifying multi-component mixtures has been advanced which overcomes the disadvantages of conventional fractional crystallization processes. This method involves cooling a liquid multi-component mixture from which the separation is to be made so as to form crystals of at least one component and thereafter supplying the resulting slurry to a crystal separation and purification column. In this column, crystals are separated from mother liquor and then introduced into a purification section in one end of which a melting section is maintained. The crystals are moved through the purification section toward the melting section where the crystals are melted, and a portion of the melt is withdrawn as product. The remainder of the melt is displaced countercurrently to the movement of crystals and in intimate contact therewith so as to remove occluded impurities.

When practicing the above-described crystal separation and purification method, it has been found to be desirable to supply to the separation and purification column a slurry which has a constant solids content. When operating in this manner, the production of a high purity product in high yields is greatly facilitated. It also makes possible a steady operating procedure in which fluctuations in product yield and product purity are reduced to a minimum. Furthermore, when practicing the above-described method, it is often desirable to maintain the solids content of the slurry as high as possible while still producing a slurry which is capable of flowing. In order to maintain a high solids content slurry, close control over the refrigeration process whereby the solids are formed is required. Several methods have been advanced for controlling the operation of the crystal forming means so as to provide a slurry having a constant solids content. One method proposes controlling the refrigeration requirements in accordance with the temperature of the slurry. However, this method has not been entirely satisfactory, particularly in systems in which there are large changes in solids content with small changes in temperature. In accordance with the instant invention, a method is provided for computing and controlling the solids content of a chiller effluent in response to a measurement of the heat required to melt all the solids in a small sample stream of the chiller effluent, which can be advantageously used with all systems, particularly with those exhibiting large changes in solids content with small changes in temperature.

It is an object of this invention to provide improved fractional crystallization apparatus.

Another object of the invention is to provide an improved process for the separation of components of multi-component mixtures.

Still another object of the invention is to provide fractional crystallization apparatus comprising an improved crystal forming means having associated therewith means for controlling the solids content of a crystal slurry.

Still another object of the invention is to provide apparatus for controlling the refrigeration requirements of a chiller in response to a measurement of the heat content of the solids slurry formed in the chiller.

A further object of the invention is to provide an improved chiller which includes means for controlling the solids content of the slurry formed therein in response to a measurement of the heat required to melt all the solids in a sample stream of the slurry produced in the chiller.

A still further object of the invention is to provide a method for controlling the refrigeration requirements of a chiller so as to obtain a slurry having a desired solids content.

Other objects, aspects, and the several advantages of the invention will become apparent to one skilled in the art upon consideration of the accompanying disclosure.

Broadly speaking, the present invention is directed to the separation and purification of components of multi-component mixtures and involves controlling the operation of the chiller or crystallizer so as to provide a slurry having a desired constant solids content. The control method of this invention is based upon the discovery that the heat content of a slurry obtained by cooling any given feed mixture is a function of the amount of solids contained in the slurry. In one embodiment, in a process which comprises passing a slurry of solids in mother liquor into a purification zone, separating mother liquor from the slurry within the purification zone, moving solids through the purification zone toward a melting zone, melting solids in the melting zone, displacing a portion of the resulting melt into the moving solids, and recovering a purified product from the melting zone, the invention resides in the improvement comprising measuring the heat content of the slurry passed into the purification zone, and adjusting the solids content of the slurry in response to this measurement.

Heat content or enthalpy of a solid-liquid slurry at a given temperature as used herein is the heat required to raise the slurry from an arbitrarily selected reference temperature to the given temperature. The higher the solids content of a slurry at a certain temperature, the lower its heat content is because additional heat must be added to melt the solids as well as to heat the liquid to a higher temperature. A measure of the heat content and hence the solids content of a slurry may therefore be obtained by adding a measured amount of heat to the slurry and measuring the resulting temperature increase of the system.

The present invention resides in computing and controlling the solids content of the chiller effluent in response to a measurement of the heat required to melt all the solids in a small sample stream of the chiller effluent. The heat input by the heater ($Q_H$) has to equal the heat absorbed by the ice slurry. The heat absorbed ($Q_w$) by the ice slurry equals $$W_w \cdot C_{p_w} \cdot (T_1 - T_2) + F_s W_w L_f$$

where $Q_w$ = B.t.u./hr.
$W_w$ = flow rate of heated sample, lb./hr.
$C_{p_w}$ = specific heat of liquid in sample, B.t.u./(lb.)(° F.)
$T_1$ = temperature of exit liquid, ° F.
$T_2$ = temperature of inlet sample slurry, ° F.
$F_s$ = fraction of solids in slurry
$L_f$ = latent heat of fusion of solids, B.t.u./lb.
$Q_H$ = Watts (3.413) B.t.u./hr. = $Q_w$
= 3.413$E$ B.t.u./hr. ($E$ = watts)

Equating the above gives:

$$3.413E = W_w \cdot C_{p_w} \cdot (T_1 - T_2) + F_s W_w L_F$$

The solids computer then solves the following equation:

$$F_s = \frac{3.413E - W_w \cdot C_{p_w}(T_1 - T_2)}{W_w \cdot L_F}$$

$F_s$ thus computed gives the necessary fraction of solids in the chiller effluent slurry which is then utilized by the controller to manipulate the supply of refrigeration to the chiller so as to hold said computed solids content at a desired value.

The process described herein can be advantageously employed in conjunction with practically any system to which fractional crystallization is applicable in order to increase the efficiency of the separation. Thus, the process and apparatus of this invention are applicable to a vast number of simple binary and complex multicomponent systems. The invention is particularly applicable to the separation of hydrocarbons which have practically the same boiling points and are, therefore, difficult to separate by distillation. Where high boiling organic compounds are concerned, separation by distillation is often undesirable because many such compounds are unstable at high temperatures. One particular advantageous application of the process lies in its use with systems which exhibit large changes in solids content with small changes in temperature, e.g., with a mixture containing 85 mol percent or more 2-methyl-5-vinylpyridine, with normal paraffins, or with a system containing a high percentage of water. In order to illustrate some of the systems to which the invention is applicable, the following compounds are grouped with respect to their boiling points:

|  | B.P., ° C. | F.P., ° C. |
|---|---|---|
| Group A: | | |
| Benzene | 80 | 5.5 |
| n-Hexane | 69 | −94 |
| n-Heptane | 98.52 | −90.5 |
| Carbon tetrachloride | 77 | −22.8 |
| Acrylonitrile | 79 | −82 |
| Ethyl alcohol | 78.5 | −117.3 |
| 2,2-dimethylpentane | 79 | −125 |
| 3,3-dimethylpentane | 86 | |
| Methyl ethyl ketone | 79.6 | −86.4 |
| Methyl propionate | 79.9 | −87.5 |
| Methyl acrylate | 80.5 | |
| 1,3-cyclohexadiene | 80.5 | −98 |
| 2,4-dimethylpentane | 80.8 | −123.4 |
| 2,2,3-trimethylbutane | 80.9 | −25 |
| Cyclohexane | 81.4 | 6.5 |
| Acetonitrile | 82 | −42 |
| Cyclohexene | 83 | −103.7 |
| 2-methylhexane | 90 | −119 |
| 3-methylhexane | 89.4 | −119.4 |
| Group B: | | |
| Methyl cyclohexane | 100.3 | −126.3 |
| Cyclohexane | 81.4 | 6.5 |
| n-Heptane | 98.52 | −90.5 |
| 2,2,4-trimethylpentane (isooctane) | 99.3 | −107.4 |
| Nitromethane | 101 | −29 |
| p-Dioxane | 101.5 | 11.7 |
| 2-pentanone | 101.7 | −77.8 |
| 2-methyl-2-butanol | 101.8 | −11.9 |
| 2,3-dimethylpentane | 89.4 | |
| 3-ethylpentane | 93.3 | −94.5 |
| Group C: | | |
| Toluene | 110.8 | −95 |
| Methylcyclohexane | 100.3 | −126.3 |
| 2,2,3,3,-tetramethyl butane | 106.8 | 104 |
| 2,5-dimethylhexane | 108.25 | −91 |
| 2,4-dimethylhexane | 110 | |
| 2,3-dimethylhexane | 113.9 | |
| 3,4-dimethylhexane | 116.5 | |
| 3-ethyl-2-methylpentane | 114 | |
| 3-ethyl-2-methylpentane | 119 | |
| Group D: | | |
| Aniline | 184.4 | −6.2 |
| Toluene | 110.8 | −95 |
| Benzene | 80.0 | 5.5 |
| Group E: | | |
| Carbon tetrachloride | 77 | −22.8 |
| Chloroform | 61 | −63.5 |
| $CS_2$ | 46.3 | −108.6 |
| Acetone | 56.5 | −95 |
| Group F: | | |
| Ortho-xylene | 144 | −27.1 |
| Meta-xylene | 138.8 | −47.4 |
| Para-xylene | 138.5 | 13.2 |
| Group G: | | |
| Ortho-cymene | 175.0 | −73.5 |
| Meta-cymene | 175.7 | −25 |
| Para-cymene | 176.0 | −73.5 |
| Group H: | | |
| Dimethyl phthalate | 282 | 5.5 |
| Dimethyl isophthalate | 124 | 67 |
| Dimethyl terephthalate | (12 mm.) 288 | 140.6 |
| Group I: | | |
| Ortho-nitrotoluene | 222.3 | −10.6 |
|  |  | −4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups. For example, benzene can be separated from a benzene-n-hexane or a benzene-n-heptane mixture in which the benzene is present in an amount greater than the eutectic concentration. In the same manner, para-xylene may be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, and mixtures of at least two of carbon tetrachloride, chloroform, and acetone. The invention is also applicable to the separation of individual components from a system of cymenes.

This invention can also be utilized to purify naphthalene, hydroquinone (1,4-benzenediol), paracresol, paradichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from $C_{10}$ aromatics.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it is also desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple, and tomato. It is also possible to concentrate vegetable juices and beverages such as milk, beer, wine, coffee and tea by this method. The desired degree of concentration can be closely controlled by varying the amount of water frozen from the juice or beverage in the chiller. This aspect of this invention is in general applicable in those instances where it is desired to increase the concentration of a solution by removing at least a portion of the solvent therefrom.

For a more complete understanding of the invention, reference may be had to the following description and the drawings, in which.

Figure 1:
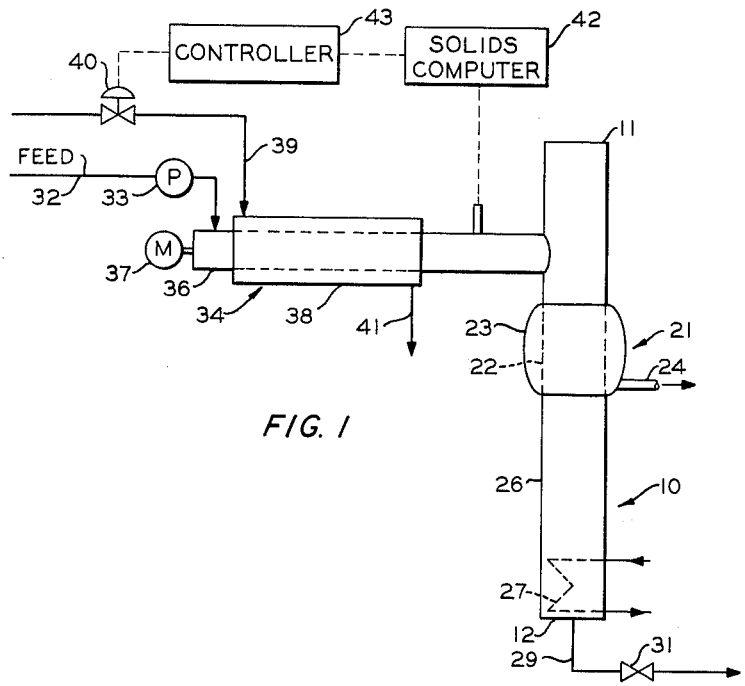
FIGURE 1 is an elevational view of fractional crystallization apparatus illustrating the present invention.

Referring to FIGURE 1 of the drawing, an elongated crystal purification column 10 is closed at its upper and lower ends by closure members 11 and 12, respectively. Filter section 21, disposed in an intermediate portion of column 10, comprises a filter medium, such as a filter screen 22, surrounded by jacket 23. Jacket 23 has a line 24 connected thereto for withdrawal of liquid from the filter section. The portion of column 10 below filter section 21 and in communication therewith comprises purification section 26. A heat exchange means is positioned in the lower end of column 10 in order to provide a crystal melting section in that end of the column. As illustrated, the heat exchange means is a coil 27 through which a heat transfer medium is circulated. However, it is not intended to limit the invention to the specific heating means shown, for other suitable means can be employed. For example, an electrical heater may be positioned next to closure member 12, a coil may be disposed around column 10 at its lower end, or an electrical bayonet type heater may be provided to extend into the end of the column. Hot liquid may also be injected into the column in order to melt the crystals. A liquid outlet line 29 provided with a valve 31 is connected to the end of column 10 to provide means for the removal of melt or a mixture of melt and crystals from the melting section.

Feed inlet line 32 leading from a source of feed material, not shown, and containing a pump 33 is connected to the inlet end of chiller 34. Chiller 34 can be any conventional type of refrigerating or crystal forming means such as a scraped surface chiller. As illustrated, the chiller comprises a cylindrical member 36 having positioned therein means for moving crystal slurry formed therein through the chiller, such as an auger connected to a motor 37. The cylindrical member is closed at its outer end while its other end is connected to column 10 at a point above filter section 21. Cylindrical member 36 is encompassed by a jacket 38 through which a coolant, such as a brine solution or an alcohol-water mixture, is continuously circulated by means of inlet line 39 and outlet line 41 connected to the jacket. Line 39 contains a flow control means, such as a motor valve 40, to provide means for controlling the rate at which the coolant is introduced into the jacket. It is also within the scope of the invention to position this valve in outlet line 41. Thus when the desired refrigeration is accomplished by the evaporation of a normally gaseous material, e.g., a light hydrocarbon, such as propane, valve 40 is positioned in line 41 to provide means for controlling the rate of evaporation.

In the operation of the apparatus of FIGURE 1, a liquid feed, which may be a liquid multi-component mixture, is pumped from a source, not shown, by pump 33 into chiller 38. Chiller 38 is maintained at a temperature low enough to crystallize a portion of one of the components and form a slurry of crystals in mother liquor. This is accomplished by circulating a suitable coolant through jacket 38 by means of lines 39 and 41. As discussed hereinbefore, it has been found that for improved operation of the crystal purification apparatus, it is important to provide a crystal slurry having a predetermined constant solids content. In accordance with the control method of this invention, the solids content of the chiller is computed by solids computer 42 and controlled by controller 43 in response to a measurement of the heat required to melt all the solids in a small sample stream of the chiller effluent.

Figure 2:
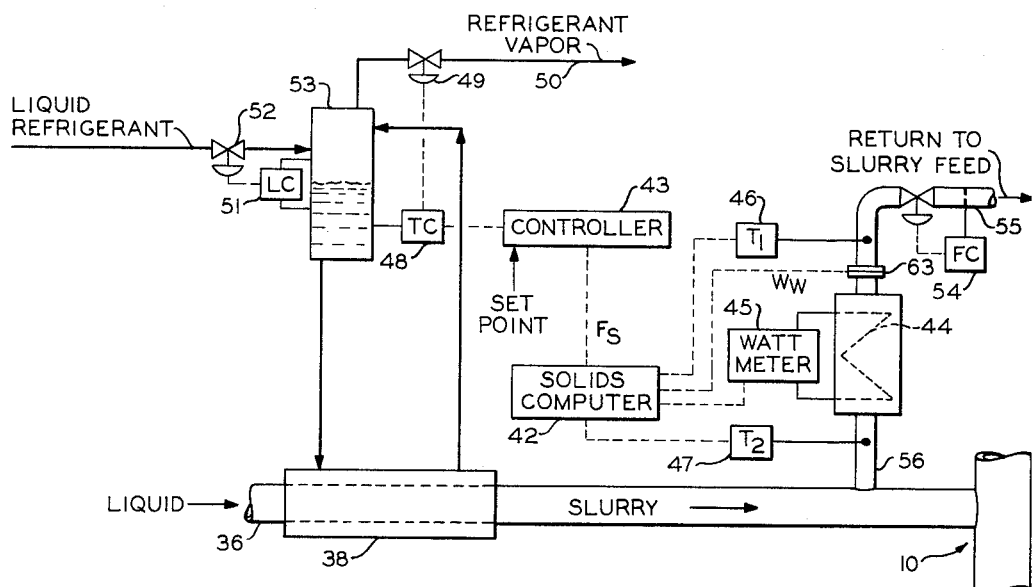
FIGURE 2 is a detailed view of the heat measuring system for continuous operation used in the apparatus of FIGURE 1.

Solids computer 42 and controller 43 are shown in more detail in FIGURE 2 of the drawing. Feed pipe 36 has communicating with the side of same at a point beyond chiller 38 a conduit 56 which is adapted to remove from the solids slurry from the chilling zone 38 a small sample stream. Temperature sensing element 47 is so adapted as to determine the temperature of the sample stream which represents the temperature of the total slurry leaving the chiller 38. This temperature signal is then introduced to solids computer 42. Watt meter 45 is adapted to provide an exact amount of electricity to coil 44 which is sufficient to melt all of the solids in the sample stream. A signal representative of this measured quantity of heat is then introduced to solids computer 42. Temperature sensing element 46 is so adapted to derive the resulting temperature of the now solids-free stream which has been subjected to a specific quantity of heat. This element likewise produces a signal which is introduced into solids computer 42. Liquid flow measuring means 63 provides a signal to the solids computer which is representative of the flow rate of the sample stream. Solids computer 42, described subsequently, produces a signal representative of the solids content of the main stream slurry. This signal is then conveyed to controller 43 and may be pneumatic, electrical or the like which in turn compares same with a predetermined set point which may be manually or automatically adjusted. The signal produced by controller 43, whether mechanical, electrical, or the like, is then equivalent to the difference between the actual solids content of the slurry stream and the desired solids content of the stream. This signal then in turn manipulates the set point of temperature controller 48 which regulates the valve 49 to control the amount of refrigerant vapor removed from storage 53 and thereby controls the pressure and hence the temperature in chiller 38 so as to maintain the solids content of the slurry passing from same at a desired level. Liquid level control 51 is utilized to control valve 52 and in turn the level of liquid refrigerant in storage tank 53. The melted sample passes through conduit 55 wherein the rate of flow of same is controlled by flow controller 54 and is returned to the chiller feed, by a conduit not shown.

Figure 3:
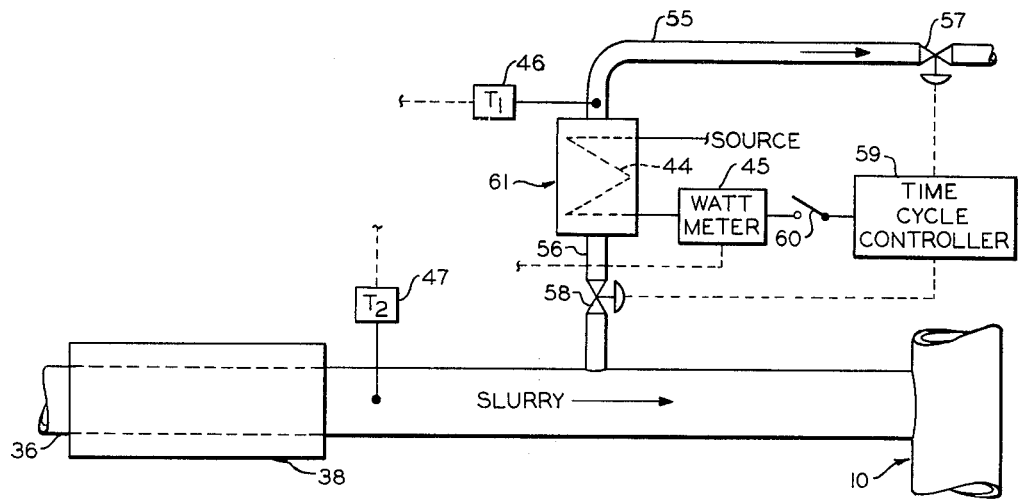
FIGURE 3 is a detailed view of the heat measuring system for batch operation used in the apparatus of FIGURE 1.

FIGURE 3 illustrates a system similar to that of FIGURE 2 with the exception that the sample system is operated in a batch rather than a continuous manner. Conduits 56 and 55 are provided with valves 58 and 57 which are so adapted as to be automatically opened and closed upon receipt of the proper signal and thus along with heating zone 61 form a batch container for melting a sample of the slurry. Time cycle controller 59 is so adapted that a signal is provided to valves 57 and 58 which opens 58 and 57 and allows a small sample of the slurry to be introduced into the conduit between same. As soon as this sample has filled the zone between the valves, a second signal is produced which closes valves 58 and 57 and thus allows the solids computation to be carried out in a batch type operation. After the sample is in position, the computation of the solids content is carried out in a manner similar to that described for the apparatus of FIGURE 2. However, the introduction of a quantity of heat to zone 61 is regulated by time cycle controller so that switch 60 is closed by the time cycle controller 59 after valves 58 and 57 have been closed so as to have zone 61 full of a fresh sample.

Figure 4:
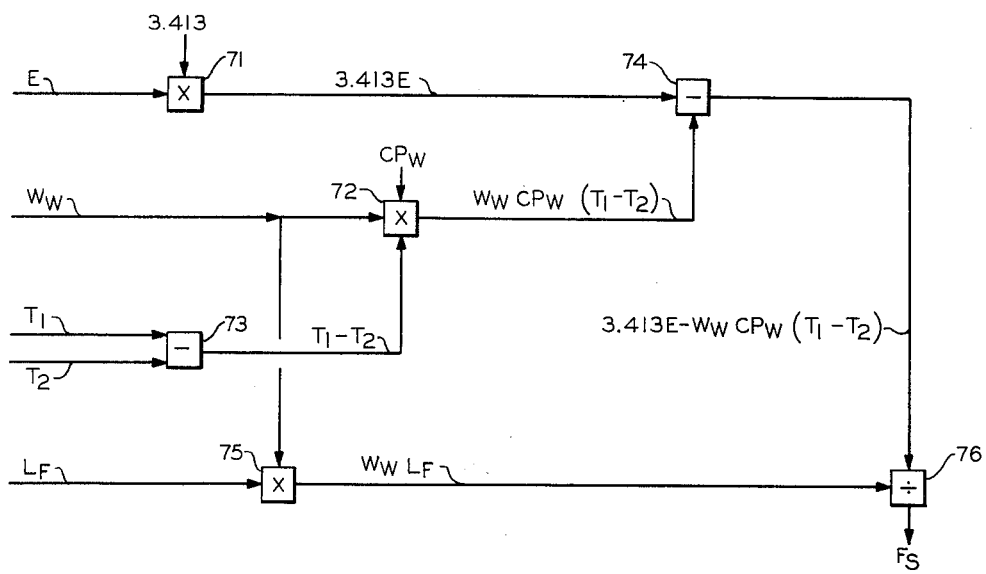
FIGURE 4 is a schematic representation of the solids computer of FIGURE 1.

The computer represented in FIGURE 4 illustrates the continuous system. It serves to provide a signal representative of the solids content of the sample stream which in turn represents the solids content of the effluent of the chiller. Watt meter 45, FIGURE 2, provides a signal E which represents the rate of heat introduced to coil 44 (see FIGURE 2). This signal is introduced to multiplier 71 which multiplies same by 3.413 to give the value $Q_H$. A signal representative of the flow rate of the warm liquid $W_w$ is introduced to multiplier 72 which then multiplies same by the specific heat of liquid $C_{P_w}$. The signals representative of the temperature of the exit, heated liquid and the solids slurry $T_1$ and $T_2$, respectively, are introduced to subtractor 73 which produces a signal representative to $T_1-T_2$. This signal is introduced to multiplier 72 and the net results of the multiplier 72 is a signal $W_w C_{P_w} (T_1-T_2)$. This is introduced to subtractor 74 along with the signal produced by multiplier 71 so as to obtain a signal $3.413E - W_w C_{P_w}(T_1-T_2)$. A second signal representative of the flow rate of warm liquid is introduced to multiplier 75 which has also introduced to same $L_f$—the latent heat of fusion of the solids. This multiplier then produces a signal representative of $W_w L_f$ which is then introduced to divider 76 which also receives the signal produced by subtractor 74. The signal obtained as a result of this operation equals $F_s$—the fraction of solids in the slurry.

The control method of this invention is dependent upon the fact that the heat content of the slurry stream is a function of the solids content of that slurry. In the operation of the control system, rate of flow controller 43 is given an initial setting which provides the coolant circulation rate necessary to obtain a slurry having a desired solids content. It has been found that a slurry having a certain solids content has a specific heat content. If the heat content of the slurry changes, controller 43 operates so as to reset temperature controller 48 which in turn adjusts valve 49, thereby altering the rate of flow of the coolant through the chiller jacket. For example, if the measured heat content increases, indicating a decrease in the solids content, valve 49 is opened by a preselected amount, thereby increasing the coolant circulation rate. Conversely, if the measured heat content decreases, indicating an increase in the solids content of the slurry, valve 49 is closed by a preselected amount so as to decrease the coolant circulation rate.

By proceeding as described hereinbefore, it is possible to supply a slurry having a desired constant solids content to the upper end of purification column 10. Upon introduction into column 10, the slurry is moved downward by means previously described. Within filter section 21 mother liquor is separated from the crystals and removed from the column through line 24. The crystals thereafter continue their movement as a uniform mass downwardly through the column. Crystals on approaching the end of column 10 enter the melting zone maintained in the end of the column be heating means 27. The melting zone is maintained at a temperature at least as high as the melting point of the crystals by continuously circulating a heat exchange medium through the coil of the heating means. On reaching the melting zone, at least a portion of the crystals are melted, and a portion of the resulting melt is displaced upwardly as a reflux stream into the downwardly moving mass of crystals. The reflux stream on contacting the crystals upstream of the melting zone displaces occluded impurities from the crystals by refreezing thereon. A liquid stream comprising displaced impurities is removed from column 10 through filter section 21 by means of line 24. A substantially pure product in the form of melt or a mixture of melt and crystals is withdrawn from the melting zone through line 29.

In the case of fruit juice, beverage, etc., concentration, the concentrate is removed through filter 21 and nearly pure water from the bottom of the column.

While the instant invention has been described in conjunction with a particular crystal purification column, it is not intended to so limit the invention. The invention may be used with any device which separates fusible solids from liquid such as centrifuges, filters, screens, cyclones, etc. One type of crystal purification apparatus with which the instant invention can be advantageously used is described in U.S. Patent No. 2,854,494. Another column is described by Schmidt in Re. 23,810. Furthermore, while the apparatus of FIGURE 1 has, for the sake of clarity of understanding, been illustrated and described as occupying a substantially vertical position it is not intended to so limit the invention. It is understood that the apparatus can be otherwise disposed without departing from the spirit or scope of the invention. Thus, the separation and purification column can be positioned horizontally or the column can be operated vertically with the melting zone in the top of the column rather than in the bottom as illustrated.

A more comprehensive understanding of the invention may be obtained by reference to the following illustrative example.

*Example*

Beer containing 3.6 wt. percent alcohol is cooled in chiller 38 to a temperature of about 26° F. This produces a slurry at the chiller outlet containing 35% solids (ice). A small sample of the slurry from the chiller is continuously taken into the melting chamber (shown in FIGURE 2) at the rate of 10 pounds per hour and a temperature $T_2$ of 26° F. Heat is continuously applied by coil 44 and measured by Watt meter 45 to be 215 watts. Outlet temperature $T_1$ is measured to be 50° F.

These measurements are fed to the computer 42 which with the built-in constants of 0.96 B.t.u./(lb.)(°F.) for specific heat of 3.6 wt. percent alcohol concentration in water, and 143.6 B.t.u./lb. for heat of fusion of ice, permits the computer to solve the equation:

$$F_s = \frac{3.413E - W_w \cdot C_{P_w}(T_1-T_2)}{W_w \cdot L_f}$$

$$F_s = \frac{3.413(215) - (10)(0.96)(50-26)}{(10)(143.6)}$$

$$F_s = 35 \text{ wt. percent}$$

This computed value of $F_s$ is fed to controller 43 which compares the computed value of 35 with the set point value of 37 wt. percent. Since the computed value is lower than desired, controller 43 calls for a lower temperature from temperature controller 48 which responds by opening the valve 49. This lowers the pressure in surge tank 53 and hence the temperature of boiling refrigerant in chiller 38 and the solids content in the chiller effluent increases to 37%. Corrective action then ceases.

Reasonable variations and modifications may be made within the scope of the foregoing disclosure, the drawings and the appended claim to the invention.

I claim:

In a process which comprises cooling a liquid multi-component mixture to form a slurry of solids in mother liquor, passing a slurry of solids in mother liquor into a purification zone, separating mother liquor from said slurry within said purification zone, moving solids through said purification zone toward a melting zone, melting solids in said melting zone, displacing a portion of the resulting melt into said moving solids, and recovering a purified product from said melting zone, the improvement which comprises measuring the heat content of said slurry passing into said purification zone by withdrawing a sample of said slurry and passing same into a heating zone, determining a first temperature of said withdrawn slurry, heating said sample of slurry in said heating zone, determining a second temperature of said sample after heating of same, measuring the amount of heat required to melt the solids in said slurry, introducing the resulting measured values into means for determining the solids content of said slurry and thereafter adjusting the cooling to regulate the solids content of the slurry being formed in response to the solids content of said sample.

References Cited by the Examiner
UNITED STATES PATENTS

| | | | |
|---|---|---|---|
| 2,078,026 | 4/1937 | Sandell | 62—223 |
| 2,478,863 | 8/1949 | Davis | 62—58 X |
| 2,683,178 | 7/1954 | Findlay. | |
| 2,894,997 | 7/1959 | Hachmuth | 62—58 |
| 2,997,856 | 8/1961 | Pike | 62—58 |
| 3,077,746 | 2/1963 | Gans | 62—58 |
| 3,093,649 | 6/1963 | Ratje | 260—707 X |

FOREIGN PATENTS 217,766    10/1958    Australia.

NORMAN YUDKOFF, *Primary Examiner.*